(12) United States Patent
Volkert et al.

(10) Patent No.: US 9,181,352 B2
(45) Date of Patent: Nov. 10, 2015

(54) METHOD FOR PRODUCING POLYSACCHARIDE ESTERS OR POLYSACCHARIDE MIXED ESTERS

(75) Inventors: Bert Volkert, Berlin (DE); André Lehmann, Potsdam (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 231 days.

(21) Appl. No.: 13/322,372

(22) PCT Filed: May 26, 2010

(86) PCT No.: PCT/EP2010/003200
§ 371 (c)(1),
(2), (4) Date: Feb. 8, 2012

(87) PCT Pub. No.: WO2010/136191
PCT Pub. Date: Dec. 2, 2010

(65) Prior Publication Data
US 2012/0172587 A1    Jul. 5, 2012

(30) Foreign Application Priority Data
May 27, 2009   (DE) .................. 10 2009 022 805

(51) Int. Cl.
| | | |
|---|---|---|
| *C08B 31/02* | (2006.01) | |
| *C08B 33/02* | (2006.01) | |
| *C08B 35/02* | (2006.01) | |
| *C08B 31/16* | (2006.01) | |
| *C08B 33/06* | (2006.01) | |
| *C08B 35/06* | (2006.01) | |
| *C08B 31/00* | (2006.01) | |
| *C08B 33/00* | (2006.01) | |
| *C08B 35/00* | (2006.01) | |
| *C07H 1/00* | (2006.01) | |
| *C07H 3/00* | (2006.01) | |
| *C08B 37/00* | (2006.01) | |
| *C08B 31/04* | (2006.01) | |
| *C08B 3/00* | (2006.01) | |

(52) U.S. Cl.
CPC .. *C08B 31/04* (2013.01); *C08B 3/00* (2013.01)

(58) Field of Classification Search
CPC ................................. C08B 3/00; C08B 31/04
USPC .............................. 536/49, 45, 124
See application file for complete search history.

(56) References Cited

U.S. PATENT DOCUMENTS

| | | | | |
|---|---|---|---|---|
| 4,011,392 | A | * | 3/1977 | Rudolph et al. ............... 536/108 |
| 4,020,272 | A |   | 4/1977 | Tessler |
| 5,147,929 | A | * | 9/1992 | Blankemeyer-Menge et al. .................. 525/54.11 |
| 6,495,679 | B1 |  | 12/2002 | Tanaka et al. |
| 8,277,554 | B2 |  | 10/2012 | Gruenler et al. |
| 3,389,740 | A1 |  | 3/2013 | Massonne et al. |
| 2007/0065483 | A1 |  | 3/2007 | Chudzik |
| 2012/0172587 | A1 |  | 7/2012 | Volkert et al. |

FOREIGN PATENT DOCUMENTS

| | | |
|---|---|---|
| DE | 102008024089 A1 | 11/2009 |
| EP | 0415235 A2 | 3/1991 |
| WO | WO-00/31144 A1 | 6/2000 |
| WO | WO-2008/100577 A1 | 8/2008 |
| WO | WO-2009/059934 A1 | 5/2009 |

OTHER PUBLICATIONS

Zhao, H., Song, Z., Cowins, J.V., Olubajo, O. (2008) Microwave-Assisted Esterification of N-Acetyl-L-Phenylalanine Using Modified Mukaiyama's Reagents: A New Approach Involving Ionic Liquids. International Journal of Molecular Sciences, vol. 9, p. 33-44.*
Misaki, T., Nagase, R., Matsumoto, K., Tanabe, Y. (2005) Ti-Crossed-Claisen Condensation between Carboxylic Esters and Acid Chlorides or Acids: A Highly Selective and General Method for the Preparation of Various β-Keto Esters. Journal of the American Chemical Society, vol. 127, No. 9, p. 2854-2855.*
Connors, K.A., Pandit, N.K. (1978) N-Methylimidazole as a Catalyst for Analytical Acetylations of Hydroxy Compounds. Analytical Chemistry, vol. 50, No. 11, p. 1542-1545.*
"Chem 239: Chapter 20" from the University of Washington [online]. (2008) Retrieved on Dec. 16, 2014. Retrieved from the internet <http://depts.washington.edu/chemcrs/bulkdisk/chem239A_spr08/notes_Chapter%2020%20-%20Bowman.pdf>.*
"International Application No. PCT/EP2010/003200, International Preliminary Report on Patentability dated Nov. 29, 2011", (w/ English Translation), 12 pgs.
"International Application No. PCT/EP2010/003200, International Search Report mailed Sep. 30, 2010", (w/ English Translation), 7 pgs.
"International Application No. PCT/EP2010/003200, Written Opinion mailed Sep. 30, 2010", (w/ English Translation), 10 pgs.

(Continued)

*Primary Examiner* — Scarlett Goon
(74) *Attorney, Agent, or Firm* — Schwegman Lundberg & Woessner, P.A.

(57) ABSTRACT

The invention relates to a method for producing polysaccharide esters or polysaccharide mixed esters, in which a polysaccharide or a modified polysaccharide is converted with at least one esterification reagent and at least one halogenide component, an imidazole compound which is generated in situ being used as catalyst.

8 Claims, 1 Drawing Sheet

(56) References Cited

OTHER PUBLICATIONS

Fringant, C., et al., "Preparation of mixed esters of starch or use of an external plasticizer: two different ways to change the properties of starch acetate films", *Carbohydrate Polymers*, vol. 35, (1998), 97-106.

Neumann, U., et al., "Synthesis of Hydrophobic Starch Esters by Reaction of Starch with Various Carboxylic Acid Imidazolides", *Starch*, vol. 54, No. 10, (2002), 449-453.

Ren, J. L., et al., "Acetylation of wheat straw hemicelluloses in ionic liquid using iodine as a catalyst", *Carbohydrate Polymers*, 70(4), (2007), 406-414.

* cited by examiner

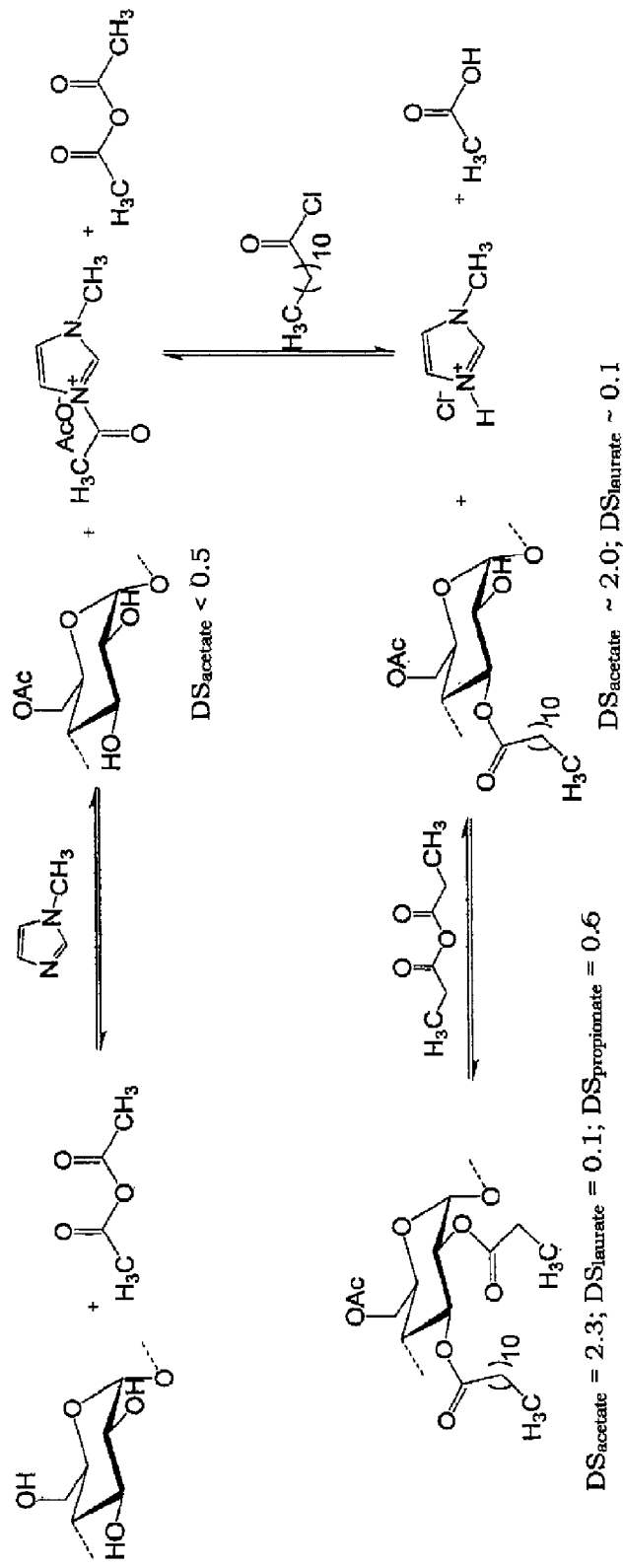
Diagram 1 Reaction diagrams for synthesis in the example of starch acetate propionate laurate

METHOD FOR PRODUCING POLYSACCHARIDE ESTERS OR POLYSACCHARIDE MIXED ESTERS

PRIORITY CLAIM TO RELATED APPLICATIONS

This application is a national stage application under 35 U.S.C. §371 of PCT/EP2010/003200, filed May 26, 2010, and published as WO 2010/136191 A1 on Dec. 2, 2010, which claims priority to German Application No. 10 2009 022 805.5, filed May 27, 2009, which applications and publication are incorporated by reference as if reproduced herein and made a part hereof in their entirety, and the benefit of priority of each of which is claimed herein.

The invention relates to a method for producing polysaccharide esters or polysaccharide mixed esters, in which a polysaccharide or a modified polysaccharide is converted with at least one esterification reagent and at least one halogenide component, an imidazole compound which is generated in situ being used as catalyst.

Starch-based polymers, such as e.g. starch esters, starch acetate and starch propionate, are known constituents or matrices for use in the foodstuff industry, as fibres and also as plastic materials.

In order to achieve reasonable properties, such as e.g. water absorption or mechanical functions, of the possible plastic materials resulting therefrom, a correspondingly high substitution ($DS_{ester} \geq 2$) is indispensable.

In order to improve the mechanical properties of such starch esters, above all with respect to the breaking elongation, the introduction of longer-chain substituents is most promising from a chemical point of view for thus obtaining starch mixed esters. A specifically controlled synthesis or such starch derivatives is to date still not known.

Generally, a starch ester is obtained by conversion with the corresponding acid or acid anhydride alone or by the addition of a catalyst. There are known as catalysts, for example aminic organic compounds, acids of alkaline aqueous solutions for this quasi homogeneous process implementation.

When using alkaline catalysts, generally starch esters with a higher molecular mass can be produced.

Whilst with the conversions known to date, the anhydride and the acid represent the reactive solvent, there are further methods in which the starch is in addition dissolved firstly in dimethyl sulphoxide (DMSO) and hence a homogeneous synthesis is ensured. Hence DMSO represents a further solvent which must be separated after the reaction.

An advantage of the use of DMSO as solvent is the higher reaction volume associated therewith after addition of the anhydride and possible catalysts. As a result, the viscosity of the batch is significantly reduced, as a result of which better mixing is possible. But this also implies greater complexity in the cleaning of the product after synthesis.

Starch mixed esters can be obtained by conversion of the starch with various carboxylic acids, carboxylic acid anhydrides, acid chlorides or by transesterification of vinyl esters.

The procedure described in C. Fringant et al., Carbohydrate Polymers 35 (1998) 97-106, uses trifluoroacetic acid anhydride (TFEA) as promoter of the esterification of starch with the most varied of carboxylic acids. The use of this method on a pilot plant scale or on a larger production scale cannot be achieved economically because of the high concentration of TFEA which is used.

Transesterifications of vinyl esters with the polyol starch provides the most varied of mixed esters (WO 00/31144). All these methods use dried starch, from which the moisture has been withdrawn in advance in the vacuum or at 105° C. This implies additional energy consumption.

The use of imidazole to obtain long-chain starch esters is known from U. Neumann et al., Starch 54 (2002) 449-453, The most varied of carboxylic acid chlorides are thereby produced via the formation of carboxylic acid imidazolides in a toluene-based system. The thus activated carboxylic acid species then serves for esterification of the starch dissolved in DMSO.

The method described here makes it possible to obtain highly-substituted starch esters within a short time because of the preceding dewatering of the starch in the slurry with the corresponding carboxylic acid anhydride by formation of the corresponding carboxylic acid and also because of the use of imidazole derivatives. The imidazole derivatives thereby catalyse the esterification reaction, not by activation of the carboxylic acid but by formation in situ of the corresponding salts after addition of a halogenide component, such as e.g. carboxylic acid chlorides. Furthermore, the most varied, of starch mixed esters can be obtained by varying the carboxylic acid anhydrides which are used and also the use of the most varied of acid chlorides.

Because of the growing importance of problems relative to the environment, it is indispensable for industrial syntheses that the method ensures a low energy consumption (i.e. moderate reaction temperatures, short reaction times, etc.) and also an economical and ecological use of chemicals (e.g. the use of reagents with as low excess as possible).

It was therefore the object of the present invention to overcome the disadvantages known from the state of the art and to provide a method for producing polysaccharide esters which permits a more rapid method implementation which is easier to manage.

This object is achieved by the method having the features of claim 1. The further dependent claims reveal advantageous developments.

According to the invention, a method for producing polysaccharide esters or polysaccharide mixed esters is provided, in which a polysaccharide or a modified polysaccharide is converted with at least one esterification reagent selected from the group consisting of carboxylic acids, carboxylic acid anhydrides, carboxylic acid halogenides, carboxylic acid esters and mixtures hereof and also at least one halogenide component selected from the group consisting of carboxylic acid halogenides, halogenide ethers, alkylhalogenides, halogenated carboxylic acids, hydrogen halides and mixtures hereof.

A particular feature of the present invention is the implementation of the method in the presence of at least one imidazole compound, which is generated in situ, of the general formula I

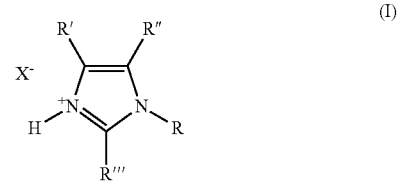

having
R, R', R" and R'", independently of each other, selected from the group consisting of $C_1$-$C_{12}$ alkyl, $C_2$-$C_{12}$ alkenyl, $C_2$-$C_{12}$ alkinyl, which can have further functional groups selected, from e.g. carbonyl-, nitro-, halogenide-, thiol- and ether functionalities and also primary, secondary and tertiary amine groups, as catalyst and X⁻ a counterion, in particular a halogenide ion selected from the group consisting of fluoride, chloride, bromide or iodide.

The method according to the invention thereby possesses essential advantages:
A significant reduction in reaction time for the synthesis of the most varied of starch esters and starch mixed esters can be achieved, i.e. the reaction time can be less than 120 minutes or less than 90 minutes.
The reaction can be implemented at low temperatures, i.e. a temperature control at 95° C. is possible, a short-term heating to 115° C. being implemented.
The imidazole compound used in the reaction can be recycled and possibly used again for further modifications.

For the synthesis of starch esters, e.g. starch acetates or starch propionates, air-dried starch is suspended firstly in the esterification reagent, e.g. a carboxylic acid anhydride, with heating before the imidazole compound is added and the reaction temperature is increased. Subsequently, the addition of the halogenide component and also of a second anhydride component into the reaction mixture is effected. The reaction time thereby is at most 2 h and leads to highly-substituted starch esters.

For the synthesis of starch mixed esters, either various carboxylic acid anhydrides are used as reactive reaction medium or, after partial esterification of the starch, a further esterification reagent is added, e.g. in the form of a carboxylic acid chloride.

Hence starch esters or starch mixed esters can be synthesised on a larger scale within the shortest time, with moderate reaction conditions.

Preferably, the imidazole compound is selected from salts of the group consisting of 1-methylimidazole, 1-ethylimidazole, 1-propylimidazole, 1-butylimidazole, 1-vinylimidazole, 1-acetylimidazole and mixtures hereof.

The molar ratio of imidazole compound to polysaccharide or modified polysaccharide is preferably in the range of 1:2 to 1:0.3. The molar ratio of imidazole compound to halogenide component is preferably in the range of 1:1 to 1:0.4.

There are used as esterification reagent, preferably straight-chain or branched $C_1$-$C_{20}$ carboxylic acids, $C_1$-$C_{20}$ carboxylic acid anhydrides and/or $C_1$-$C_{20}$ carboxylic acid halogenides, in particular straight-chain or branched $C_1$-$C_6$ carboxylic acids, $C_1$-$C_6$ carboxylic acid anhydrides and/or $C_1$-$C_6$ carboxylic acid halogenides. The carboxylic acids, carboxylic acid anhydrides and/or carboxylic acid halogenides can thereby also be substituted with ether-, allyl-, vinyl- and/or quaternary nitrogen groups.

There are possible as polysaccharides, both modified and unmodified starches or celluloses. In the case of starch these can originate from wheat, rice, maize, potatoes, peas, barley, rye and/or millet.

The reactive conversion is effected preferably at a temperature in the range of 90° C. to 200° C. Reaction temperatures of 90° C. to 150° C. are preferred and particularly preferred of 95° C. to 120° C.

The conversion is effected at most within 24 h and preferably within 2 h.

A preferred variant of the method according to the invention provides that the polysaccharide and/or the modified polysaccharide is dewatered before the reaction. The dewatering is implemented preferably at a temperature of 80 to 120° C.

A further preferred variant provides that the polysaccharide can be derivatised homogeneously up to a weight proportion of 50% by weight of the reaction batch.

The subject according to the invention is intended to be explained in more detail with reference to the subsequent FIGURE and examples without wishing to restrict this to the special embodiments shown here.

FIG. 1 shows the reaction diagram for the synthesis of starch acetate propionate laurate.

EXAMPLE 1

Synthesis of Starch Acetate Laurate

Air-dried starch (dry content 88.9%) is placed in a suitable reaction vessel with 2.25 moleq acetic acid anhydride with agitation and heated to 95° C. After 45 min at this temperature, 0.7 moleq 1-methylimidazole is added to the reaction batch and the reaction temperature is increased to 115° C. After the batch has been agitated for 10 min at this temperature, 0.5 moleq dodecanoic acid chloride is added to the batch in drops, followed by a further 2.25 moleq acetic acid anhydride. The reaction batch is agitated for a further 45 min before this is cooled to room temperature. The homogeneous batch is precipitated in ethanol and washed with the same. A starch acetate laurate with a total substitution degree of 2.4 is produced, the $DS_{acetate}$ being 2.35 and the $DS_{laurate}$ 0.05.

Analogously to the synthesis specification described in example 1, further syntheses were implemented to produce starch acetate laurates, in which 1-methylimidazole was replaced by various imidazole derivatives. The results are compiled in Table 1.

TABLE 1

Achieved substitution degrees of the respective starch ester by varying the imidazole component

| Example | Imidazole derivative | $DS_{acetate}$ | $DS_{laurate}$ |
|---|---|---|---|
| 2 | 1-ethylimidazole | 2.41 | 0.10 |
| 3 | 1-vinylimidazole | 2.30 | 0.08 |
| 4 | 1-butylimidazole | 1.42 | 0.03 |
| 5 | 1-acetylimidazole | 2.63 | 0.14 |

EXAMPLE 6

Synthesis of Starch Acetate Laurate

The synthesis was implemented as in example 1 but the moleq of 1-methylimidazole and also dodecanoic acid chloride were halved. After processing, a starch acetate laurate with $DS_{acetate}$ 0.70 and the $DS_{laurate}$<0.1 is produced.

EXAMPLE 7

Synthesis of Starch Propionate Hexanoate

The synthesis was implemented as in example 1, propionic acid anhydride and also hexanoic acid chloride being used instead of acetic acid anhydride and dodecanoic acid chloride. After ethanolic processing, a fibrous white product with a $DS_{proprionate}$=2.84 and $DS_{hexanoate}$=0.16 is produced.

Analogously to the specification explained in example 1, various acid chlorides based on starch propionate were used for further syntheses to produce starch mixed esters. The results are displayed in Table 2.

TABLE 2

Achieved substitution degrees of the respective starch ester by varying the acid chloride

| Example | Acid chloride | ΣDS | $DS_{propionate}$ | $DS_{second\ ester}$ |
|---|---|---|---|---|
| 8 | Dodecanoic acid chloride | 2.71 | 2.63 | 0.08 |
| 9 | Propionic acid chloride | 2.70 | 2.70 | / |
| 10 | Acetyl chloride | 3.00 | 2.81 | 0.19 |

EXAMPLE 11

Synthesis of Starch Acetate Propionate Laurate

Air-dried starch (dry content 88.9%) is placed in a suitable reaction vessel with 2.25 moleq acetic acid anhydride with agitation and heated to 95° C. After 45 min at this temperature, 0.7 moleq 1-methylimidazole is added to the reaction batch and the reaction temperature is increased to 115° C. After the batch has been agitated for 10 min at this temperature, 0.5 moleq dodecanoic acid chloride is added to the batch in drops, followed by 2.25 moleq propionic acid anhydride. The reaction batch is agitated for a further 45 min before this is cooled to room temperature. The homogeneous batch is precipitated in ethanol and washed with the same. A starch acetate propionate laurate with a total substitution degree of 3.0 is produced, the $DS_{acetate}=2.29$, $DS_{propionate}=0.61$ and $DS_{laurate}=0.10$.

EXAMPLE 12

Synthesis of Starch Propionate Acetate Laurate

Analogously to example 11, propionic acid anhydride was added as first carboxylic acid anhydride component and acetic acid anhydride as second. A starch propionate acetate laurate with a total substitution degree of 3.0 is produced, the $DS_{acetate}=0.57$, $DS_{propionate}=2.28$ and $DS_{laurate}=0.15$.

EXAMPLE 13

Synthesis of Starch Acetate Propionate

Analogously to example 12, acetic acid anhydride was added as first carboxylic acid anhydride component and propionic acid anhydride as second. 0.5 moleq trimethylsilylchloride is used as chloride component. A starch acetate propionate with a total substitution degree of 2.97 is produced, the $DS_{acetate}=1.82$, $DS_{propionate}=1.15$. A substitution by etherification could not be detected by C-NMR spectroscopy.

EXAMPLE 14

Synthesis of Starch Propionate

Instead of 1-methylimidazole, as described in example 7, pyridine was used as base. A starch propionate with a substitution degree of 0.4 is produced.

EXAMPLE 15

Various starch esters described in the preceding examples were mixed with triacetin as plasticiser, processed on a twin-screw extruder (170° C./250 rpm) and after subsequent injection moulding (cylinder temp.: 165° C.; casting mould temp.: 65° C.; pressure: 550 bar), was examined with respect to tensile strength, modulus of elasticity and breaking elongation according to ISO 527, type 5 A (see table 3)

TABLE 3

| Starch ester from example | Triacetin content [% by weight] | Tensile strength [MPa] | Modulus of elasticity [GPa] | Breaking elongation [%] |
|---|---|---|---|---|
| 5 | 10 | 24.0 | 1.8 | 1.5 |
| 7 | 10 | 19.8 | 0.8 | 18.7 |
| 8 | 10 | 16.7 | 0.7 | 18.2 |
| 10 | 10 | 22.3 | 1.1 | 11.7 |
| 11 | 10 | 31.1 | 1.4 | 16 |
| 12 | 10 | 18.8 | 0.9 | 25 |

The invention claimed is:

1. A method of esterifying at least one selected from the group consisting of a starch starting material and a modified starch starting material to provide at least one selected from the group consisting of a starch ester and a starch mixed ester, the method comprising:

combining the starch starting material or modified starch starting material with at least one esterification reagent selected from the group consisting of a carboxylic acid, carboxylic acid anhydride, a carboxylic acid ester, and mixtures thereof, to form a reaction mixture;

heating the reaction mixture to 90° C. to less than 120° C.;

adding N-methyl imidazole to the reaction mixture;

increasing the temperature of the reaction mixture to greater than 90° C. to less than or equal to 120° C.;

adding at least one halogenide component selected from the group consisting of a carboxylic acid halogenide, halogenide ether, alkylhalogenide, a halogenated carboxylic acid, and mixtures thereof, and optionally at least one additional esterification reagent selected from the group consisting of a carboxylic acid, carboxylic acid anhydride, a carboxylic acid ester, and mixtures thereof; and allowing the reaction mixture to react to form the starch ester, mixed starch ester, or combination thereof, wherein the esterifying is complete within about 24 hours;

wherein the reaction generates an imidazole compound of the general formula (I)

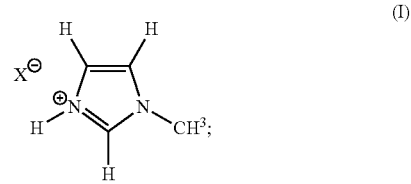

wherein $X^-$ is a counterion, wherein the imidazole compound of formula (I) is a catalyst in the esterification reaction, wherein a molar ratio of the N-methyl imidazole to the starch starting material or the modified starch starting material is in the range of 1:2 to 1:0.3, and wherein the molar ratio of the N-methyl imidazole to the halogenide component is in the range of 1:1 to 1:0.4.

2. The method according to claim 1, wherein the starch originates from at least one selected from the group consisting of wheat, rice, maize, potatoes, peas, barley, rye, and millet.

3. The method according to claim 1, wherein the esterification reagent is at least one selected from the group consisting of a straight-chain or branched $C_1$-$C_{20}$ carboxylic acid, a $C_1$-$C_{20}$ carboxylic acid anhydride, and a $C_1$-$C_{20}$ carboxylic acid halogenide.

4. The method according to claim 1, wherein the esterification reagent is at least one selected from the group consisting of a straight-chain or branched $C_1$-$C_6$ carboxylic acid, $C_1$-$C_6$ carboxylic acid anhydride, and a $C_1$-$C_6$ carboxylic acid halogenide.

5. The method according to claim 1, wherein at least one selected from the group consisting of the carboxylic acid, the carboxylic acid anhydride, and the carboxylic acid halogenide are substituted with at least one selected from the group consisting of an ether, allyl, vinyl, and a quaternary nitrogen group.

6. The method according to claim 1, wherein the method comprises performing the esterification within 2 h.

7. The method according to claim 1, further comprising dewatering at least one selected from the group consisting of the starch starting material and the modified starch starting material before the esterification.

8. The method according to claim 7, wherein the dewatering comprises a temperature of 80 to 120° C.

* * * * *